United States Patent [19]
Baier

[11] Patent Number: 5,185,764
[45] Date of Patent: Feb. 9, 1993

[54] RECEIVER FOR TIME-VARYING DISTORTED SIGNALS

[75] Inventor: Alfred Baier, Eckental, Fed. Rep. of Germany

[73] Assignee: U.S. Philips Corporation, New York, N.Y.

[21] Appl. No.: 564,223

[22] Filed: Aug. 7, 1990

[30] Foreign Application Priority Data

Sep. 8, 1989 [DE] Fed. Rep. of Germany ....... 3926277

[51] Int. Cl.⁵ .......................... H03H 7/18; H03H 7/30
[52] U.S. Cl. ......................................... 375/13; 375/15
[58] Field of Search ............................ 375/11, 13, 15; 358/905

[56] References Cited

U.S. PATENT DOCUMENTS

| | | | |
|---|---|---|---|
| 4,004,226 | 1/1977 | Qureshi et al. | 375/13 |
| 4,047,013 | 9/1977 | Milewski | 375/13 |
| 4,397,029 | 8/1983 | Satorius et al. | 375/13 |
| 4,433,425 | 2/1984 | de Jaeger | 375/13 |
| 4,674,103 | 6/1987 | Chevillat et al. | 375/13 |
| 4,733,402 | 3/1988 | Monsen | 375/101 |

OTHER PUBLICATIONS

A. Baier, "Correlative and Iterative Channel Estimation in Adaptive Viterbi Equalizers for TDMA Mobile Radio Systems," ITG Fachbericht 107, at the ITG Professional Meeting, Stochastische Modelle und Methoden in der Informationstechnik, Nuremberg, Apr. 12-14, 1989, pp. 363-368.

Primary Examiner—Benedict V. Safourek
Assistant Examiner—Young Tse
Attorney, Agent, or Firm—David R. Treacy

[57] ABSTRACT

A receiver for time-varying distorted data signals, includes an equalizer and a channel estimator which generates a channel information signal with the aid of a training signal sent together with the data signal and with the aid of an image of the training signal stored in the receiver, and applies this signal to the equalizer. The receiver further includes an arrangement for channel tracking which generates correction values for the channel information signal with the aid of data detected by the equalizer. At very high relative velocities between the sender and the receiver (e.g. 200 km/h when using the mobile radio set in a motor vehicle, for example) a degradation of the bit error rate is avoided in that, at least part of or the complete received training signal is applied to the arrangement for channel tracking prior to the data signals to be equalized and detected after the channel information determined on the basis of the training signal has been transmitted.

5 Claims, 3 Drawing Sheets

RECEIVER FOR TIME-VARYING DISTORTED SIGNALS

DESCRIPTION

The invention relates to a receiver for time-varying distorted data signals, comprising an equalizer, a channel estimator which generates a channel information signal with the aid of a training signal sent together with the data signal and with the aid of an image of the training signal stored in the receiver, and applies this signal to the equalizer, and which receiver includes an arrangement for channel tracking which generates correction values for the channel information signal with the aid of the data detected by the equalizer.

In digital transmission systems comprising dispersive transmission channels, a transmitted signal that contains send information in the form of data symbols is distorted on its way through a transmission channel due to differences in delay and phase shifts. The result of these distortions is that the data symbols contained in the received signal are influenced by preceding data symbols (intersymbol interference).

Dispersive transmission channels are found in both radio transmission systems and guided transmission. Delay differences and phase shifts occur, for example, as a result of reflections and in radio transmission systems as a result of multipath propagation. Especially in radio transmission systems, in which send and receive stations are portable, for example, in a mobile radio system, these distortions are, in addition, time-varying. In order to recover the original data contents of the signal it is necessary to equalize the received signal. Time-varying distortions cause special problems then because the channel information with the aid of which the equalizer performs the equalization, should track the time-dependent changes of the transmission channel.

In the article entitled "Correlative and Iterative Channel Estimation in Adaptive Viterbi Equalizers for TDMA Mobile Radio Systems" by Alfred Baier, ITG Fachbericht 107, at the ITG Professional Meeting "Stochastische Modelle und Methoden in der Informationstechnik", Nuremberg, Apr. 12-14, 1989, pp. 363 to 368, an equalizer for a mobile radio system is discussed in which the equalizer is accordingly tracked during the equalization.

The receiver forms part of a digital transmission system for a plurality of subscribers, in which system data are transmitted according to a time-division multiple access method. The data to be transmitted will be referred to as useful data in the sequel. In addition to the useful data still further data known a priori to the receiver as so-called training sequences are transmitted along for a channel estimation in each time slot burst. By means of baseband conversion and subsequent sampling, quadrature components I and Q are formed from a received input signal and buffered in a signal RAM. A channel estimator determines a channel impulse response from the training sequence present in each time slot burst. This channel impulse response is buffered in a coefficient RAM and applied to a Viterbi equalizer and an arrangement for channel tracking. The principle of the Viterbi equalization for signals distorted by intersymbol interference is described in the article by G.D. Forney: "Maximum-Likelihood Sequence Estimation of Digital Sequences in the Presence of Intersymbol Interference", IEEE Trans. Inf. Th., Vol. IT-18, No. 3, pp. 363-378, May 1972.

Once the Viterbi equalizer has received the channel impulse response calculated for one time slot, the I and Q components of the received signal (sample values) buffered in the signal RAM are read out step-by-step and equalized by the Viterbi equalizer. The equalization is then an implicit part of the maximum-likelihood detection of the received data sequence performed in the Viterbi equalizer. The Viterbi equalizer supplies at its output directly the data symbols corresponding to the data signal.

Both the sample values read out step-by-step of the received signal and the detected data symbols of the useful data are applied to an arrangement for channel tracking. For each sample value when it is sufficient, or after various sample values respectively, the arrangement for channel tracking determines a new estimated value for the channel impulse response with the aid of a gradient algorithm further described in the above article. The estimated values formed each time for the channel impulse response are applied via the coefficient RAM to both the arrangement for channel tracking and to the Viterbi equalizer. When the tracked channel impulse response is assigned to the sample value to be equalized in the equalizer, under specific circumstances, a time-dependent shift of the sequence length of various data symbols is to be taken into account. In this manner the estimated values applied to the Viterbi equalizer extremely well correspond to the actual channel impulse responses, so that the bit error rate of the equalized useful data coming from the Viterbi equalizer is small.

With very high relative velocities between the sender and the receiver (e.g. 200 km/h when the mobile radio set is operated in a motor vehicle) this may nevertheless lead to a degradation of the bit error rate.

It is an object of the present invention to minimise the bit error rate in the received signal in a receiver of the type set out in the opening paragraph also in the case of very high relative velocities between the sender and the receiver.

This object is achieved in that at least part of or the complete received training signal is applied to the arrangement for channel tracking after the channel information determined on the basis of the training signal has been transmitted prior to the data signals to be equalized and detected.

It is a advantage of the invention that the bit error rate is independent of the position of the detected data symbols. In this manner the bit error rate at the beginning of a useful data sequence is as small as at the end of the detected useful data sequence.

The invention will be further described and explained with reference to an exemplary embodiment and drawings in which.

Figure 1:
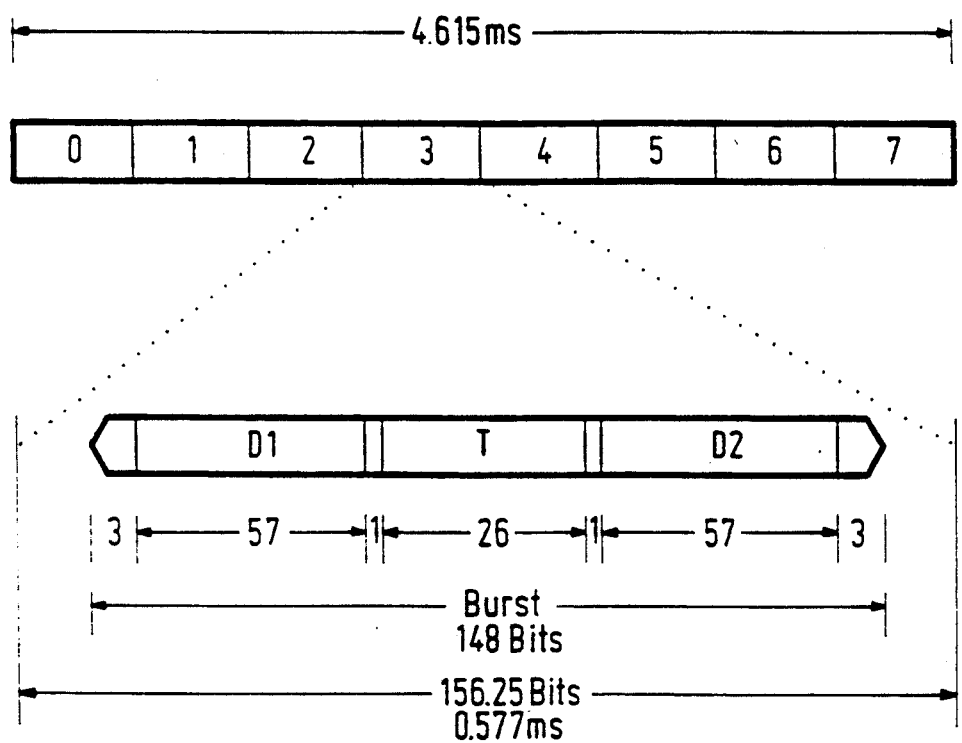
FIG. 1 shows a diagrammatic representation of a time-division multiplex frame and a time slot of the time-division multiplex frame.

As an exemplary embodiment of the invention a receiver in a mobile radio system is selected wherein each frequency channel has a time slot multiple access structure having eight time slots 0 ... 7 (FIG. 1). A time slot burst may contain a so-called normal burst, a frequency correction burst, a synchronisation burst or an access burst. In FIG. 1 a normal burst is shown in time slot 3, in the way the burst is used for transmitting useful data symbols. The useful data symbols are embedded in the time slot in two useful data sequences D1 and D2. In the middle of the time slot the training data sequence T is surrounded by the useful data sequences D1 and D2.

The data contents of the time slot are modulated by means of a Gaussian Minimum Shift Keying Technique (GMSK). As a result, and because a dispersive transmission channel is to be passed through, data signals arrive at the receiver in which the original data symbols cannot be resolved separately. If necessary, time-dependent estimable ranges can be provided in which data signals can be assigned to the originally sent data symbols and training signals can be assigned to the originally sent data symbols of the training data. For detecting the originally sent data symbols the distortions of the dispersive transmission channel are to be eliminated.

Figure 2:
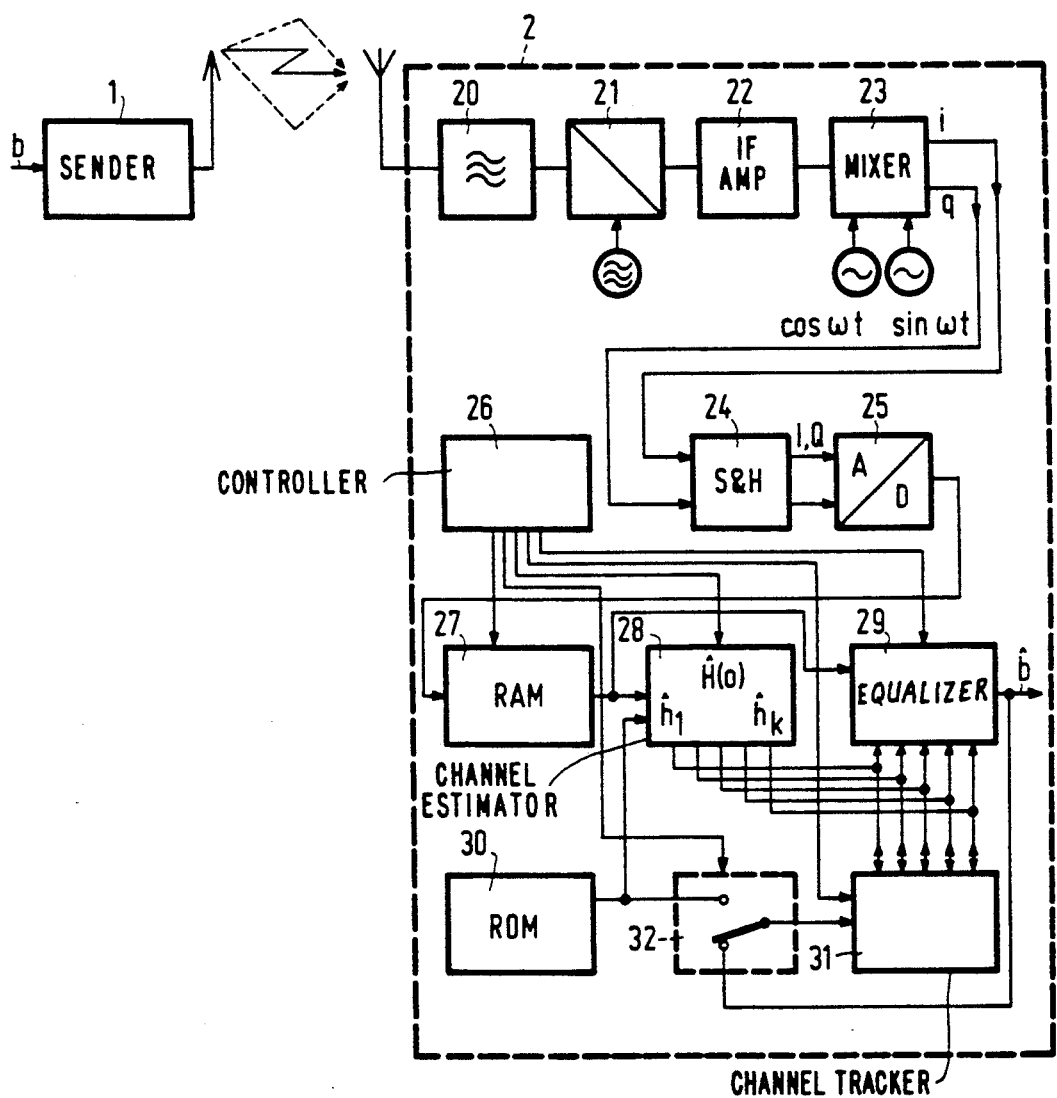
FIG. 2 shows a diagram of a circuit arrangement of a receiver.

A receiver suitable for this purpose is shown in FIG. 2. A received carrier-frequency signal is converted into a baseband frequency signal by means of a quadrature mixer 23 once it has passed through an input stage 20, in which the received signal is amplified and selected after it has passed through an intermediate-frequency mixer 21 and an intermediate-frequency amplifier 22. The quadrature signals I and Q generated by the quadrature mixer 23 are sampled by means of a sample-and-hold circuit 24 and converted into digital values by means of an analogue-to-digital converter 25. Consequently, the further inherent signal processing can be effected in digital form. By means of a synchronisation arrangement and a tracking controller 26, each of the digitised sample values I and Q of a time slot burst are stored in a first random access memory (RAM) 27 for the duration of that time-slot burst to be processed by the receiver. The period of time up to the arrival of the next time slot burst to be processed, can now be used for further processing the sample values available in RAM 27.

Digital signal processing is subdivided into equalization and detection, correlative channel estimation with the aid of time slot bursts, and iterative channel tracking. In the exemplary embodiment of the invention a Viterbi equalizer 29 is used for equalization and detection. This equalizer recovers, from the sample values of the I and Q components stored in the RAM in the receiver, the digital useful data sent by the sender, while implementing the knowledge about the instantaneous channel characteristic.

A channel estimator 28 estimates the training sequence contained in each time slot burst. Data sequences corresponding to the originally sent data symbol sequences of the training data are stored in each receiver in a read only memory (ROM) 30. The training sequence is selected such that it has a pulse-like autocorrelation function. In this way the channel estimator 28 can easily locate the position of the training sequence in the received signal by implementing the widely known algorithms. The structure of a channel estimator of this type for a Viterbi equalizer is described, for example, in the article entitled: "Bit Synchronization and Timing Sensitivity in Adaptive Viterbi Equalizers for Narrow-Band TDMA Digital Mobile Radio Systems", by A. Baier, G. Heinrich, U. Wellens, IEEE Vehicular Techn. Conf., Philadelphia, Jun. 15-17, 1988, pp. 377-384.

Through the dispersive transmission channel a signal r(t) from the sender 1 is superposed and hence distorted by the portions of signals $r(t-t_1) \ldots, r(t-t_2)$ that had already been sent before this signal, arriving in a delayed manner at the receiver. After a certain period of time, which depends on the characteristics of the transmission channel, the effect of the earliest signal portions arriving at the receiver in a delayed manner is no longer important and need no longer be taken into account during the equalization. Advantageously, the delay to be taken into account can be indicated as the number n of the data sequences sent during this time interval. Because of correlation of the distorted training sequence contained in the input signal with the undistorted training sequence stored in the ROM 30, the channel estimator 28 determines a channel impulse response $\hat{H}(O)$ consisting of various parameters $\hat{h}_1(O), \ldots, \hat{h}_k(O)$. In this connection the number k of the parameters corresponds to the number n of the data symbols to be taken into account for the equalization, providing that per bit interval one sample value is formed.

If more sample values are taken per bit interval, in order to obtain k, n is to be multiplied by the number of sample values interval. This estimated channel impulse response $\hat{H}(O)$ is applied to the Viterbi equalizer 29 as a vector of the input parameters.

In time-division multiplex systems having transmission channels whose channel characteristics change very rapidly, i.e. within the period of one time slot burst, the actual channel impulse response has already changed considerably prior to the arrival of the next training signal and thus the possibility to form a new estimate for the impulse response. It is necessary, therefore, to track the channel impulse response within the time burst.

For this purpose, the exemplary embodiment comprises an inserted arrangement for iterative channel tracking 31, which, with the aid of an iterative tracking algorithm, continuously adapts this estimate to the changes of the current channel impulse response $\hat{H}_i(O)$ for each position in the time slot on the basis of the estimated value of the channel impulse response $\hat{H}_O(O)$ determined in the current time slot. The arrangement for iterative channel tracking included in the exemplary embodiment of the invention is extensively discussed in the article mentioned in the introductory part of this document.

The useful data $\hat{b}(i)$ detected by the Viterbi equalizer are written as input data of a transversal filter, whose filter coefficients at instant i correspond to the impulse response coefficient $h_k(i)$. The complex output signal $\hat{s}(i)$ of this filter is compared to the real sample values $I(i)$ and quadrature values $Q(i)$ stored in the ROM and a more complex error size $$e(i) = I(i) + jQ(i) - \hat{s}(i).$$

is formed. From this error size e(i) a gradient vector is computed which indicates in which direction the channel impulse response $\hat{H}_i(O)$ is to be changed to minimise the error. By adding a correction value vector which is proportional to this gradient vector to each last estimated channel impulse response $\hat{H}_i(O)$ the new estimate $\hat{H}_{(i+1)}$ is formed for the channel impulse response. This provides a satisfactory estimate of the real channel impulse response.

Figure 3:
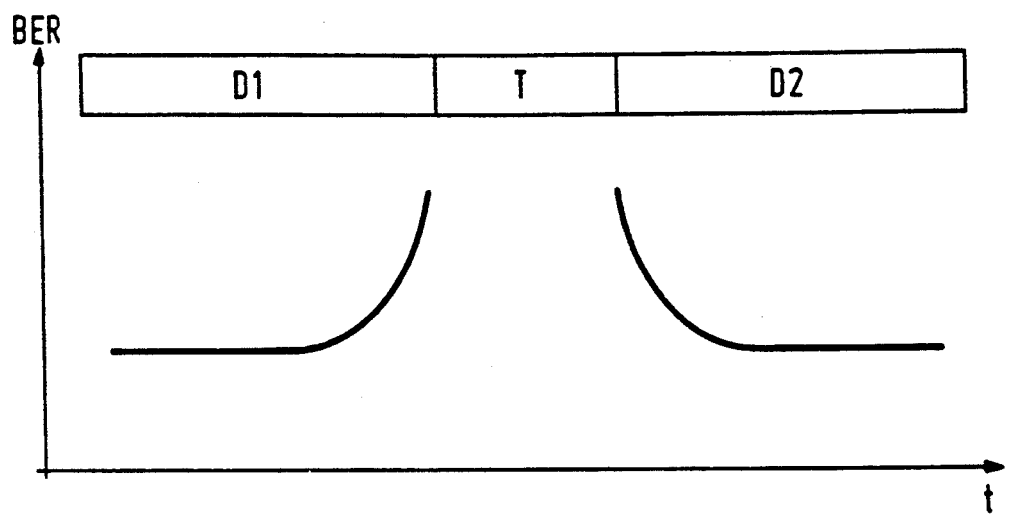
FIG. 3 shows a bit error rate diagram.

FIG. 3 shows a bit error curve in which the bit errors on average are related to the positions of the detected data symbols over a rather large number of estimated time slot bursts. Plotted in vertical direction is a bit error rate BER and in horizontal direction a time axis t. The top half of the diagram represents a time slot burst corresponding in time to the subdivision along the time axis. The higher bit error rate at the beginning of estimation of the useful data burst each time at the beginning and end of the training sequence T of the represented time slot, as against the end of the processing of the useful data sequence at the beginning and end of the represented time slot is distinctly noticeable.

The initial estimate $\hat{H}(O)$ determined on the basis of the training signal cannot exactly represent the real channel impulse response present at the beginning of the useful data burst because the channel impulse response varies with time. Therefore, in an exemplary embodiment of the invention this training signal is placed before the useful data burst after the estimate $\hat{H}(O)$ of the channel impulse response has been determined in a first process stage by correlation of the training sequence stored in the ROM with the received training signal in a second process stage. In a third process stage the equalization and detection, as described hereinbefore, of the useful data bursts and the related tracking of the channel impulse response is performed, but now of the total sequence of training signal and useful data sequence. The order of the process stages is controlled by a central controller 26.

During the tracking of the training signal not the equalized data sequence provided by the Viterbi equalizer but the training data sequence stored in the receiver in the ROM 30 is applied to the channel tracking arrangement. This is symbolically shown in FIG. 2 by a change-over switch 32 controlled by the central controller 26, which switch thereto connects the output of the ROM 30 to the data input of the arrangement for iterative channel tracking 31. Once the tracking algorithm has reached the useful data portion, the useful data symbols $\hat{b}$ equalized and detected by the Viterbi equalizer 29 are applied to the arrangement for channel tracking. The switch 32 has then again assumed the state shown in FIG. 2. This is advantageous in that during the channel tracking operation guaranteed error-free data symbols in the training signal are used for the iterative channel tracking. It is furthermore advantageous in that the equalizer in this case need not equalize and detect the training signal. The equalizer/detector 29, controlled by the central controller 26, skips this part of the received signal. This makes a saving on processing time and power consumption possible.

In the exemplary embodiment the training signal is inserted between two useful data sequences. Thus the depicted processing is to be effected two times in the exemplary embodiment. On the one hand, to equalize the useful data sequence D2 following the training signal, as described hereinbefore, the training signal is placed before the useful data sequence and the iterative channel tracking is commenced at the beginning of the training signal. To process the first data signals D1 preceding the training sequence, the training signal is placed after these first data signals D1 and the resulting total sequence is mirror inverted, so that the mirror-inverted training signal is again placed at the beginning of the total signal to be equalized. This mirror-inverted total signal is also processed in the manner described, whereas this time the iterative channel tracking operation starts with the end of the training signal and the total signal is processed almost in reverse.

The data signals D1 and D2 are again combined to the original data sequence by means of a further processing stage (not shown) to which the detected data signals D1 and D2 are applied.

Figure 4:
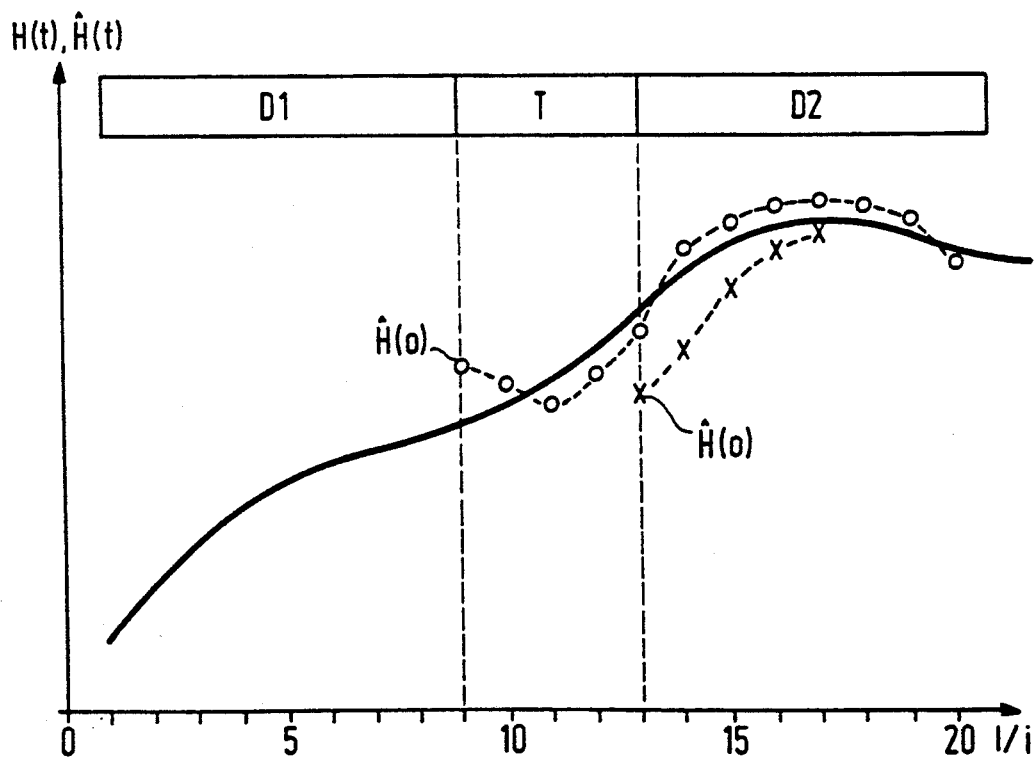
FIG. 4 shows a diagram showing the variation of a channel impulse response curve.

FIG. 4 shows in a diagram by means of a curve the variation of the real channel response $H_r(O)$ during a time slot. The estimates $\hat{H}_i(O)$ the channel impulse response are represented as small crosses or as small circles respectively. This representation can only be diagrammatic because the channel impulse responses are composed of k individual parameters. For clarity, the tracking of channel impulse response $\hat{H}(O)$ is represented only for the second useful data signal D2. $\hat{H}(O)$ represents the estimate of the channel impulse response of the transmission channel determined by the channel estimator during the training signal.

It will be evident that this estimate H(0) corresponds with a mean value of the variation of the channel impulse response during the training signal T. If the iterative channel tracking were commenced, starting from this estimate (i=13), this would result in the variation of the tracked channel impulse response represented by the small crosses. These crosses do not approach the real variation of the channel impulse response until after a plurality of trackings (i=16). If the initial value $\hat{H}(O)$ is started with at the beginning of the training signal (i=9), the estimate for the channel impulse response appears from the estimate curve formed by the small circles.

It is clearly noticeable that the difference between the determined initial estimate for the channel impulse response and the real channel impulse response till the last training signal has been processed is reduced by the arrangement for iterative channel tracking. Consequently, if the processing of the second useful data sequence D2 (i=13) is commenced, the difference between each estimate of the channel impulse response and the real channel impulse response is about as small as shown in the curve of the useful data estimates.

Depending on the time-dependent changes of the channel impulse response it is also sufficient, under specific circumstances, to perform iterative channel tracking with part (about half or the last third part) of the training signal.

Customarily, signal processors are used for equalization and detection, channel estimation and iterative channel tracking and any further digital signal processing linked therewith. The processing discussed hereinbefore can simply be realised also in a receiver in which a signal processor of this type is used. Thereto, for example, when performing part of the program for iterative channel tracking, first the training data sequences stored in the ROM, and when this stage is terminated, the sample values stored in the RAM, are applied to the signal processor, for example, by transmitting address information signals.

I claim:

1. A receiver for signals, including data signals and a training signal, transmitted over a transmission channel which introduces time-varying distortion of said signals, comprising means for receiving said data and training signals and providing sample values of the received signals; means for determining a channel information signal; and means, utilizing said channel information signal, for equalizing said sample values of said data signals, said means for determining comprising means for storing a corresponding copy of said training signal in said receiver; a channel estimator for comparing sample values of received copy with said corresponding training signal, to provide said channel information signal; and an arrangement for channel tracking which generates correction values for the channel information signal, with the aid of data equalized by said means for equalizing, characterized in that at least a part of a complete training signal is applied to the arrangement for channel tracking prior to the data signals to be equalized and detected.

2. A receiver as claimed in claim 1, characterized in that said part of a complete training signal applied to the arrangement for channel tracking is a part of said corresponding copy of said training signal.

3. A receiver as claimed in claim 2, characterized in that, during processing of the training signal in the channel tracking arrangement, signals received by the means for equalizing are not equalized and detected.

4. A receiver as claimed in claim 3, characterized in that said arrangement for channel tracking is an interactive tracker having an input switchable between a first position for receiving said corresponding copy of said training signal from said means for storing, and a second position for receiving an output from said means for equalizing.

5. A receiver as claimed in claim 1, characterized in that, during processing of the training signal in the channel tracking arrangement, signals received by the means for equalizing are not equalized and detected.

* * * * *